United States Patent [19]

van Bakel et al.

[11] 4,425,809
[45] Jan. 17, 1984

[54] MEASURING OF TENSION AND MOMENTS IN A THIN FLEXIBLE TAPE

[75] Inventors: Bernardus L. M. van Bakel; Guillaume P. C. van Kooijk; Bernard P. Videc, all of Eindhoven, Netherlands

[73] Assignee: U.S. Philips Corporation, New York, N.Y.

[21] Appl. No.: 323,839

[22] Filed: Nov. 23, 1981

[30] Foreign Application Priority Data

Dec. 11, 1980 [NL] Netherlands ......................... 8006719

[51] Int. Cl.³ .............................................. G01L 5/08
[52] U.S. Cl. .................... 73/862.45; 73/37.7
[58] Field of Search ................ 73/862.45, 862.39, 159, 73/826, 837, 862.46, 37.7

[56] References Cited

U.S. PATENT DOCUMENTS

| | | | |
|---|---|---|---|
| 2,276,036 | 3/1942 | Hanna et al. | 73/37.7 |
| 3,715,521 | 2/1973 | Licht | 179/100.2 P |
| 4,106,330 | 8/1978 | Hinrichs | 73/862.45 X |
| 4,131,524 | 12/1978 | Gieles | 204/129.3 |

FOREIGN PATENT DOCUMENTS 1938351  5/1977  Fed. Rep. of Germany .

Primary Examiner—Jerry W. Myracle
Attorney, Agent, or Firm—David R. Treacy

[57] ABSTRACT

A device, and method of using such a device, for measuring tension in a thin flexible tape by guiding the tape along a curved path between two parallel curved guides, supplying pressurized gaseous medium to each side of the tape, and measuring the difference in gas pressure between the two sides of the tape. Measuring ducts, terminating substantially opposite each other in the curved guide surfaces are connected to at least one pressure transducer which in turn is connected to an electrical measuring circuit.

10 Claims, 9 Drawing Figures

MEASURING OF TENSION AND MOMENTS IN A THIN FLEXIBLE TAPE

BACKGROUND OF THE INVENTION

The invention relates to a device for carrying out measurements on a thin flexible tape material, which device comprises at least one pair of guide elements which are spaced from each other and have guide surfaces facing each other which extend substantially parallel to each other and between which a guide channel for the tape material is formed. Supply ducts terminate in the guide surfaces, for supplying to both sides of a tape material in the guide channel a pressurized gaseous medium by means of which the tape material can be guided in the longitudinal direction in the guide channel along a path which is substantially parallel to and spaced from the guide surfaces. In each of these guide surfaces a termination of at least one measuring duct is situated, the measuring-duct termination or each measuring-duct termination in one guide surface being arranged at least substantially directly opposite the measuring-duct termination or an associated one of the measuring-duct terminations in the other guide surface and forming therewith a pair of measuring-duct terminations. The measuring ducts communicate with at least one pressure transducer.

A device of this type is known from British Patent Specification No. 1,461,248. In this known device the web material is guided between two guide surfaces, the medium pressure on each side being determined continuously. Depending on the distance of the material from the guide surfaces pressure variations occur on both sides of the material, which variations are converted into electrical quantities, which are added to form a sum quantity from which the local thickness of the web material is derived continuously. Such a method is suitable for thickness measurements only, because the measuring means are adapted for determining sum quantities only. Moreover the flat shape of the guide surfaces does not permit the use of measurements of a different type.

SUMMARY OF THE INVENTION

It is an object of the invention to provide a device of the type mentioned in the opening paragraph, which is capable of determining tensile stresses in a thin flexible tape material with high accuracy.

According to the invention this is achieved in that the guide surfaces have correspondingly curved shapes, the tape material can be guided in the guide channel along a curved path, and the pressure transducer is connected to measuring means for measuring the pressure difference on both sides of the tape material in such a way that the device is capable of measuring local tensile stresses in the tape material.

The device in accordance with the invention enables tensile stresses in a thin flexible foil or tape material to be measured, the curved path of the tape material in the guide channel ensuring that the material does not touch the guide surfaces, which would give rise to additional friction and thus a measuring error. By means of the device in accordance with the invention it is possible to gain an insight into the various parameters which are of importance for the transport of such a thin flexible tape material.

It is to be noted that U.S. Pat. No. 3,715,521 reveals a device employing two mutually spaced guide elements, in whose curved guide surfaces medium supply ducts terminate. In this known device one of the guide elements also forms a magnetic head. By means of this known device it is not possible to carry out measurements on the tape material to be transported between the guide elements.

In the device known from German Patent Specification No. 2,524,294 to which the aforementioned British Patent Specification No. 1,461,248 corresponds, the medium supply ducts terminate in the guide surfaces on both sides of each termination of a measuring duct. In a preferred embodiment of a device in accordance with the invention the termination of each measuring duct is situated in the respective guide surface directly opposite a central portion of the curved path of the tape material and this ensures a satisfactory pressure build-up in the guide channel and minimizes the influence of disturbing factors on the measurement.

Another embodiment of a device in accordance with the invention is characterized in that in the lateral direction of the tape material the terminations of a pair of measuring ducts are situated in the guide surfaces directly opposite the center of the lateral dimension or width of the tape material. In this way it is possible to measure the tensile or tractive force of the tape material.

A further embodiment of the device in accordance with the invention is characterized in that in the lateral direction of the tape material the terminations of at least two pairs of measuring ducts are situated symmetrically in the guide surfaces relative to the center of the width of the tape material. These steps make it possible to measure the tensile force in the tape material and to determine the bending moment in the plane of the material.

In a preferred embodiment of a device in accordance with the invention, in the lateral direction of the tape material, the terminations of one pair of measuring ducts are situated directly opposite the center of the tape material and the terminations of at least two further pairs of measuring ducts are situated symmetrically in the guide surfaces relative to the center of the tape material. By means of this arrangement it is possible to measure both the tensile force, the bending moment and the torsional moment in the tape material during transport of the tape material. Advantageously the terminations of five measuring ducts are situated in each guide surface, which terminations are arranged in a regularly distributed manner. In this way the distribution of tension in the tape material can be determined with even greater accuracy and an even more accurate determination of the tensile force, bending moment and torsional moment is possible.

In a further embodiment of a device in accordance with the invention the device comprises two pairs of guide elements, which are rigidly connected to each other and which form guide channels which adjoin each other and are arranged to guide the tape material along an undulating path. In this way, simultaneous measurements can be carried out at two locations which are spaced from each other in the longitudinal direction of the tape material. The measured variation of the moment is a measure of the transverse force in the tape material.

It is found to be advantageous if the pressure transducer is of the semiconductor type with an integrated silicon diaphragm. As a result of this, the device may have small dimensions and a high pressure sensitivity.

A method of carrying out measurements on a thin flexible tape material, with the aid of a device in accordance with the invention in which a pressurized gaseous medium is fed into the guide channel, is characterized in that the device is arranged on an apparatus which moves the tape material past tape guides in the longitudinal direction, the tape material is fed between the guide surfaces and subsequently, during transport of the tape material, the pressure difference on both sides of the tape material is determined with the pressure transducer and measuring means. From this pressure difference a parameter which is important for the tape transport is derived with the aid of the measuring means, which parameter also provides information on parts on the apparatus which are of importance for the transport of the tape material, such as the positioning of the tape guides. By means of this information an adjustment, such as a correction of the position of the tape guides, may be applied. This method provides, with high precision, a comparatively rapid control of equipment employing tape material such as video and audio magnetic tape apparatus.

The invention will be described in more detail with reference to the drawings which show some embodiments.

DESCRIPTION OF THE PREFERRED EMBODIMENTS

Figure 1:
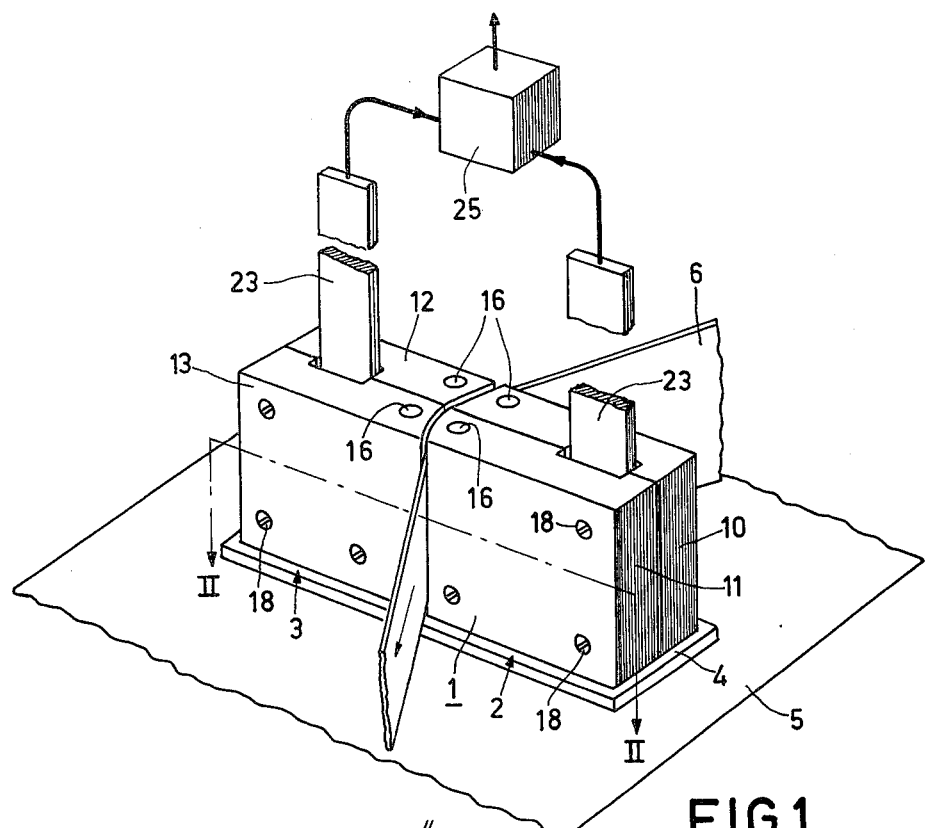
FIG. 1 is a perspective view of a device in accordance with the invention and a part of an apparatus on which the device is mounted, as well as the tape material which is guided by the device.

The device 1 shown in FIG. 1 comprises guide elements 2 and 3, which are arranged on a fitting surface 4. The surface 4 enables the device 1 to be positioned accurately relative to the other parts of an apparatus, of which only a frame plate 5 with the surface 4 is shown.

The apparatus is intended for the transport of foil on tape material 6 and for this purpose it is provided with tape guides which guide the material in a manner, not shown, and with transport means for the transport of the tape material. The tape material is of a thin flexible type, which in the embodiment shown is constituted by a magnetic tape intended for recording and/or reading signals. In the present embodiment the apparatus is also suitable for, in addition to the magnetic tape transport, recording and/or reading magnetic signals on the tape material 6.

Figure 2:
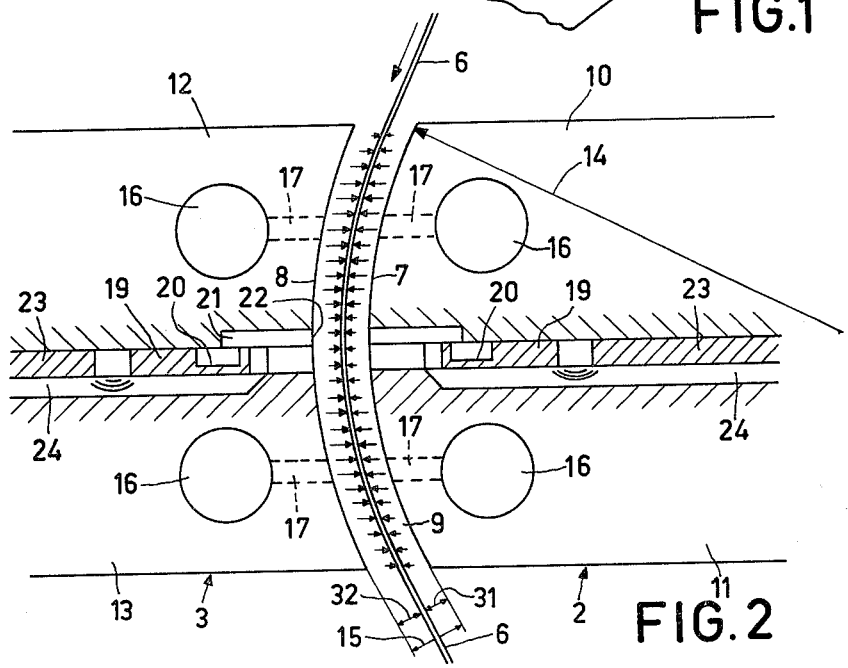
FIG. 2 is a sectional view on an enlarged scale taken on the line II—II in FIG. 1, in which for the sake of clarity the two guide elements of the device are shown at an exaggeratedly large distance from each other.
Figure 3:
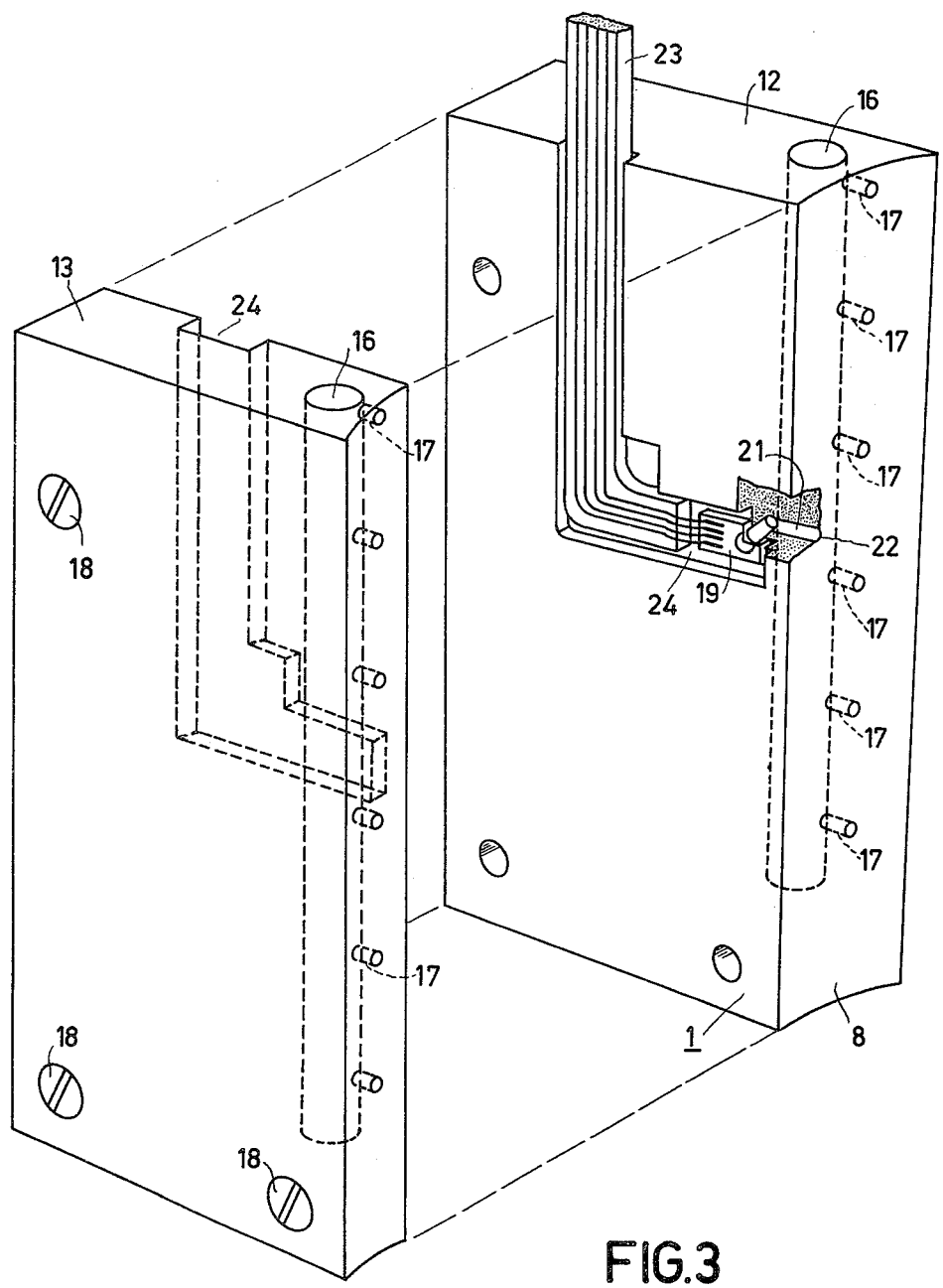
FIG. 3 is a perspective view, drawn to an enlarged scale, of parts of one of the guide elements of the device shown in FIG. 1.
Figure 4:
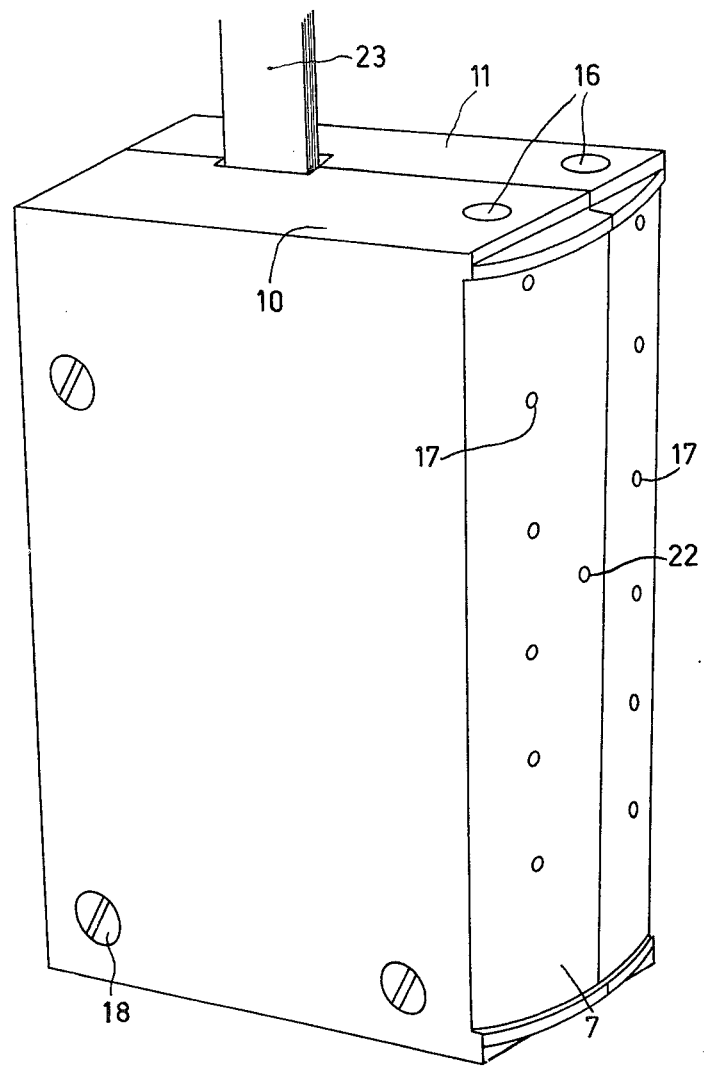
FIG. 4 is a perspective view, drawn to an enlarged scale of the other guide element of the device shown in FIG. 1.

As is also shown in FIGS. 2 to 4, the two guide elements are spaced from each other and are provided on adjacent sides with correspondingly curved guide surfaces 7 and 8 respectively which extend substantially parallel to each other. Between the guide surfaces 7 and 8 a guide channel 9 for the tape material 6 is formed. It is to be noted that in FIG. 2 the distance between the surfaces 7 and 8 is shown on an enlarged scale for a correct representation of the channel 9. The guide element 2 comprises portions 10 and 11, and the guide element 3 comprises portions 12 and 13. Each portion is constituted by a solid block of material, two of the sides of the portions 10 and 11 constituting the guide surface 7 and two of the sides of the portions 12 and 13 constituting the guide surface 8. The guide surfaces 7 and 8 are curved in a regular manner, the guide surfaces in the present embodiment each forming a part-cylindrical surface having a radius designated by the reference numeral 14 in FIG. 2, which radius is approximately 12 mm in the present embodiment. As will be described in more detail, it is alternatively possible to adapt other values for the raidus 14. The distance between the two guide surfaces, which distance is indicated by the reference numeral 15 in FIG. 2, is 0,043 mm in the present embodiment. It is emphasized that, depending on the construction of the various parts of the device it is also possible to use a different distance.

In the portions 10,11 12 and 13 main supply ducts 16 for a gaseous medium are formed, whose axes are parallel to the axes of curvature of the guide surfaces 7 and 8. The ducts 16, as is shown in FIG. 1, extend to the exterior of the device 1 and, in a manner not shown, are connected to a pumping device which pumps a pressurized gaseous medium, in the present embodiment air, into the main supply duct 16.

As is indicated in FIG. 3 medium supply ducts 17 are connected to the main supply ducts 16 in the portions 10, 11, 12 and 13 of the guide elements 2 and 3. In the embodiment shown each portion comprises 6 medium supply ducts 17, which extend parallel to each other and which terminate in the guide surfaces 7 and 8 respectively. The location of these terminations in the portions 10, 11 and 12, 13 respectively is mirror inverted relative to a plane through a control part of the guide channel. Suitably, the supply ducts 17 in said portions are arranged so that each termination in the guide surface 7 of the guide element 2 is situated directly opposite one of the terminations in the guide surface 8 of the guide element 3 and forms therewith a pair of terminations.

As is shown in FIG. 1, the portions of the guide elements are secured to each other by means of bolts 18. The two guide elements 2 and 3 are rigidly connected to each other in a manner not shown.

By means of the medium supply ducts 17 pressurized air is fed into the guide channel 9, so that the tape material 6, viewed in the longitudinal direction, is guided in the guide channel 9 along a curved path which is substantially parallel to and spaced from the guide surfaces 7 and 8. In general such guidance along a curved path is referred to as "a prestressed air bearing". This air bearing enables the tape material to be guided in rigid form and without friction so that the tape material is not influenced during a measurement.

As is shown in FIG. 3, the portions 10 and 12 each have a substantially L-shaped recess 24 in their inner upright side walls, which recess extends from the upper side of the respective portion to a point near the guide surface 7 or 8 respectively. In the recess 24 a pressure transducer 19 is accommodated, which is suitably constructed in a manner as described in the Netherlands Patent Specification No. 162, 254 to which U.S. Pat. No. 4,131,524 corresponds.

Figure 5:
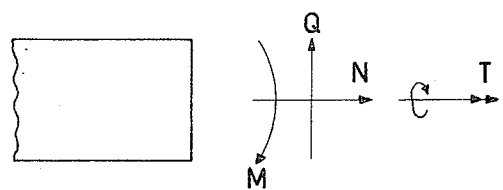
FIG. 5 represents schematically the resulting foces and moments in a cross-section of the tape material.
Figure 6:
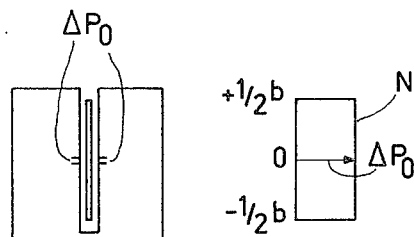
FIG. 6 represents schematically a sectional view of the device of FIG. 1, as well as a graph of the measured pressure difference.

For converting mechanical tensile stresses into electric measurement signals this pressure transducer comprises an integrated silicon diaphragm 20. It is constructed so that it occupies only a small space. Moreover, this pressure transducer has a high sensitivity to pressure. As is shown in FIGS. 2 and 3, the end of a measuring duct 21 is situated at the location of the diaphragm, a termination 22 of said duct being disposed in the respective guide surface directly opposite a central portion of the curved path of the tape material 6. Viewed in FIGS. 3 and 4, the termination, seen in the lateral direction of the tape material, is situated at approximately equal distances from the adjacent terminations of the medium supply ducts 17. By means of electrical connecting wires the pressure transducer 19 is connected to an associated p.c. board 23, whose end which extends beyond the respective guide element 2 or 3 is shown in FIG. 1. For receiving the p.c. boards 23 a recess 24 similar to the recesses 24 in the portions 10 and 12 of the guide elements is formed in each of the portions 11 and 13. As is shown in FIG. 1, the p.c. boards are connected to measuring means 25 outside the guide elements, which means are only represented schematically for the sake of clarity. The terminations 22 of the pair of measuring ducts 21 in the guide elements 2 and 3 are disposed at least substantially directly opposite each other, as a result of which the pressure transducers 19 on both sides of the tape material only determine the locally prevailing pressure. In this embodiment, viewed in the lateral direction of the tape material, the terminations of the pair of measuring ducts 21 are situated in the guide surfaces 2 and 3 directly opposite the center of the lateral dimension or width of the tape material 6. This embodiment is also schematically represented in FIG. 6. By means of this embodiment it is possible to determine the tensile force in the tape material, as is schematically represented in FIG. 5. This is effected using the following formula:

$$\Delta p = Nxx/R$$

where $\Delta p$ represents the measured pressure difference on both sides of the tape material, $Nxx$ is the resulting normal stress in the tape material, expessed in N/mm, and R is the radius of curvature of the air bearing, designated by the reference numeral 14 in FIG. 2. When the tensile force in the tape material is to be determined, for example in an apparatus for recording and/or playing back signals on a magnetic tape, the measurement may proceed as follows:

After the device 1 has been arranged at a location in the path of transport of the tape material, a calibration measurement is carried out, which measurement yields a calibration constant X. The tensile or tractive force N is then determined by $N = X \times \Delta p$. The resulting normal stress Nxx thus found is substantially independent of the distribution of the normal stress in a cross-section of the tape material, so that the present measurement is also suitable for use in the case of a non-linear distribution. For the sake of clarity, the graphical representation of N in FIG. 6 is based on a situation in which a constant tensile force N occurs, i.e. for which the moment is zero and for which the tape material is not twisted. The indication $\frac{1}{2}$ b refers to half the width of the tape material.

Figure 7:
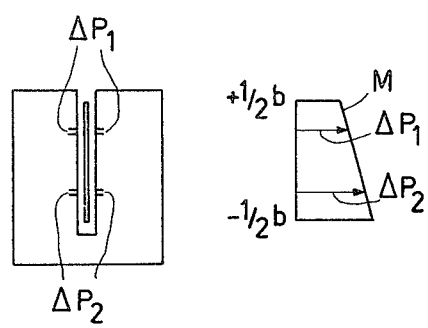
FIG. 7, like FIG. 6 represents schematically a sectional view of a device in accordance with a second embodiment of the invention, as well as a graph of the measured difference.

In a second embodiment of a device in accordance with the invention, as is represented schematically in FIG. 7, instead of one pair there are provided two pairs of measuring ducts, the terminations of which are situated symmetrically in the guide surfaces 7 and 8 relative to the center of the width of the tape material 6. In this way the respective pressure difference $\Delta p_1$ and $\Delta p_2$ at two locations on both sides of the foil or tape material can be measured. Starting from a linearly varying stress distribution over the lateral direction of the tape material, it is possible, after the calibration constants X and B have been determined by means of calibration measurements, to employ this measuring arrangement for calculating both the tensile force N and the bending moment M (also see FIG. 5) in accordance with:

$$N = X(\Delta p_1 + \Delta p_2)$$

$$M = B(\Delta p_1 - \Delta p_2)$$

The theoretical distribution of such a linear pressure distribution is graphically represented in FIG. 7.

Figure 8:
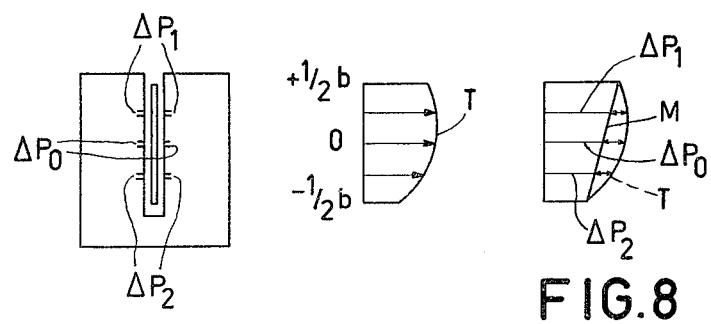
FIG. 8 like FIG. 6, represents schematically a sectional view of a device in accordance with a third embodiment of the invention, as well a graph of the measured pressure difference.

In a third embodiment of the device in accordance with the invention, which is represented schematically in FIG. 8, it is alternatively possible to arrange the terminations of one pair of measuring ducts, in the lateral direction of the foil or tape material, directly opposite the center of the width of the tape material and the terminations of at least two further pairs of measuring ducts symmetrically in the guide surfaces relative to the center of the tape material.

After the calibration constants X and B have been determined, the tensile force N and the bending moment M can again be determined as follows:

$$N = X \times (\Delta p_1 + \Delta p_0 + \Delta p_2)$$

$$M = B \times (\Delta p_1 - \Delta p_2)$$

Here $\Delta P_0$ represents the pressure difference in the center of the tape material, and $\Delta p_1$ and $\Delta p_2$ represent the values of the pressure difference at a distance from the center. Furthermore it is possible by means of this measuring arrangement to determine the torsional moment T (also see FIG. 5), so that with this embodiment torsion measurements on twisted tapes are possible. The distribution of the torsional moment in the plane of the tape material varies in accordance with a parabola T (see FIG. 8,) the deviation $\Delta p$ of the parabola T relative to the moment line M being a measure for determining the torsional moment. The torsional moment is calculated as follows.

Determine $\Delta p(y)$ in such a way that N and M are equal to:

$$N = \int_{-\frac{1}{2}b}^{+\frac{1}{2}b} \Delta p(y) dy$$

-continued $$M = \int_{-\frac{1}{2}b}^{+\frac{1}{2}b} y\Delta p(y)dy$$

Figure 9:
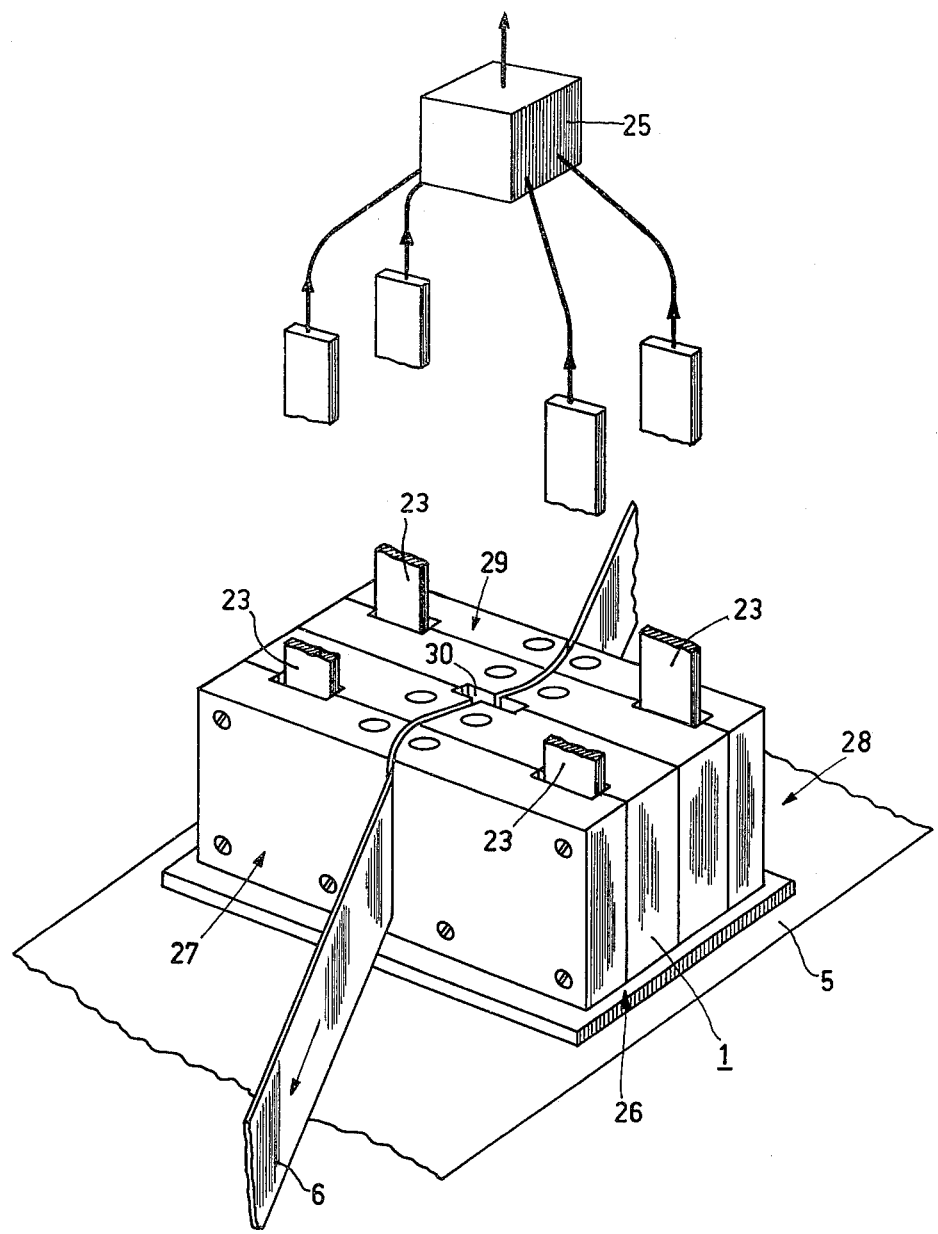
FIG. 9 is a perspective view of a device in accordance with a fourth embodiment of the invention.

In a fourth embodiment of a device in accordance with the invention, shown in FIG. 9, two pairs of guide elements 26, 27 and 128, 29 are rigidly connected to each other and are constructed so that the guide channels formed by the pairs of guide elements adjoin each other and guide the tape material along an undulating path. In FIG. 9 the undulating path is a sinusoid. Between the pairs of guide elements a continuous cavity 30 is formed, which prevents interaction between the guide channels. In the longitudinal direction the cavity 30 extends parallel to the axes of curvature of the guide surfaces. In cross-section the cavity 30 measures approximately 1 by 4 mm. In the manner shown in FIG. 9, measurements at two locations spaced from one another in the longitudinal direction of the foil on tape are possible, thereby enabling the bending moment at two locations to be determined. The variation of the moment between the two measuring locations is a measure of the transverse force Q (see FIG. 5).

It is to be noted that an even more accurate determination of stresses, forces and moments is possible by carrying out pressure-difference measurements at more than three, suitably five, locations, spaced from one another in the lateral direction of the foil on tape material.

Using this large number of measuring locations the above-mentioned quantities, namely stesses, forces and moments, can be determined with greater accuracy by the use of redundancy, that is, by employing such a large number of measuring points during this measurement that possible inaccuracies can be eliminated.

Possible uses of embodiments of the device in accordance with the invention are in the field of:
1. High-precision adjustment of video and audio recording and/or play back equipment at the factory;
2. Controlling professional video and/or audio recording and/or playback equipment and controlling foil and tape transport machines in magnetic tape and foil capacitor manufacture;
3. Controlling consumer video and audio recording and/or playback equipment provided with parts which are of importance for the tape transport. For example, the positioning of the tape guides can be corrected, when necessary, by means of device in accordance with the invention, so that the tape guides are automatically adjusted depending on the measuring signal; this possibility is particularly of interest if this equipment is already equipped with prestressed air bearings for other reasons;
4. Experimental research on tape and foil guidance systems.

It will be appreciated that the dimensions and construction of the device described in the foregoing may vary depending on the use of the device.

It is to be noted further that it is possible to measure the pressure difference Δp in a way not shown with only one pressure transducer 19. For this purpose measuring ducts communicates with one pressure transducer, which transducer may be situated in a central part of the device.

What is claimed is:

1. A device for measuring stresses in a thin flexible tape material, comprising:
    at least one pair of guide elements, spaced from each other and having guide surfaces on adjacent sides, which guide surfaces extend substantially parallel to each other and between which surfaces a guide channel is formed for the tape material,
    supply ducts terminating in said guide surfaces, for supplying to both sides of a tape in the guide channel a pressurized gaseous medium by which the tape can be guided longitudinally in the guide channel along a path substantially parallel to and spaced from said guide surfaces,
    at least one respective measuring duct having a respective measuring duct termination in each guide surface arranged at least substantially directly opposite a measuring duct termination in the other guide surface, forming therewith a pair of measuring-duct terminations, and
    at least one pressure transducer communicating with the measuring ducts,
    characterized in that the guide surfaces have correspondingly curved shapes arranged such that the tape material is guided in the guided channel along a curved path, and
    the device further comprises measuring means, connected to the pressure transducer for measuring the pressure difference on both sides of the tape material such that the device measures local tensile stresses in the tape material.

2. A device as claimed in claim 1, characterized in that at least one measuring duct termination is disposed directly opposite a central portion of said tape material curved path.

3. A device as claimed in claim 1, characterized in that at least one measuring duct termination is disposed at a location directly opposite the center of the width of the tape material.

4. A device as claimed in claim 1, characterized in that the terminations of at least two pairs of measuring ducts are disposed symmetrically with respect to the center of the width of the tape material.

5. A device as claimed in claim 1, characterized in that the terminations of one pair of measuring ducts are disposed directly opposite the center of the width of the tape material, and the terminations of at least two further pairs of measuring ducts are disposed symmetrically in the guide surfaces about said center.

6. A device as claimed in claim 5, characterized in that at least five pairs of measuring ducts are provided, the terminations of said at least five measuring ducts being arranged in a regularly distributed manner.

7. A device as claimed in any one of claims 1, 2, 3, 4, 5 or 6, characterized in that the device comprises two pairs of guide elements, rigidly connected to each other and forming guide channels which adjoin each other and are arranged to guide the tape material along an undulating path.

8. A device as claimed in claim 7, characterized in that the pressure transducer is a semiconductor type having an integrated silicon diaphragm.

9. A device as claimed in claim 1, characterized in that the pressure transducer is a semiconductor type having an integrated silicon diaphragm.

10. A method of adjusting a tape transport apparatus having guides past which the tape material is passed in the longitudinal tape direction, comprising
    providing a measuring device having at least one pair of curved guide elements spaced from the extending substantially parallel to each other to define a guide channel therebetween having a curved guide path, and means for supplying pressurized gaseous medium to both sides of a tape material in said guide channel, arranging said device on said apparatus such that tape material being transported past said tape guides is fed between said guide surfaces along said curved path, measuring the difference in pressure between the two sides of the tape at at least one location along said curved path, determining, responsive to said measuring step, at least one parameter describing the transport of the tape, and adjusting the position of an element of said apparatus responsive to the value of said parameter.

* * * * *

UNITED STATES PATENT AND TRADEMARK OFFICE
CERTIFICATE OF CORRECTION

PATENT NO.  :  4,425,809

DATED       :  January 17, 1984

INVENTOR(S) :  BERNARDUS L.M. VAN BAKEL ET AL

It is certified that error appears in the above-identified patent and that said Letters Patent is hereby corrected as shown below:

Claim 10, line 5  (Col. 8, line 67) Before "extend" change "the" to --and--.

Signed and Sealed this

Tenth Day of July 1984

[SEAL]

*Attest:*

*Attesting Officer*

GERALD J. MOSSINGHOFF

*Commissioner of Patents and Trademarks*